US009256281B2

(12) United States Patent
Ur

(10) Patent No.: US 9,256,281 B2
(45) Date of Patent: Feb. 9, 2016

(54) REMOTE MOVEMENT GUIDANCE

(75) Inventor: Shmuel Ur, Shorashim (IL)

(73) Assignee: Empire Technology Development LLC, Wilmington, DE (US)

( * ) Notice: Subject to any disclaimer, the term of this patent is extended or adjusted under 35 U.S.C. 154(b) by 189 days.

(21) Appl. No.: 13/500,657

(22) PCT Filed: Sep. 16, 2011

(86) PCT No.: PCT/US2011/051913
§ 371 (c)(1),
(2), (4) Date: Apr. 6, 2012

(87) PCT Pub. No.: WO2013/039510
PCT Pub. Date: Mar. 21, 2013

(65) Prior Publication Data
US 2013/0069862 A1 Mar. 21, 2013

(51) Int. Cl.
*G06F 3/01* (2006.01)
*G09B 19/00* (2006.01)
(Continued)

(52) U.S. Cl.
CPC *G06F 3/01* (2013.01); *A61H 3/061* (2013.01); *G06F 3/011* (2013.01); *G06F 3/016* (2013.01);
(Continued)

(58) Field of Classification Search
CPC ............. A63B 26/00; A63B 71/00; A63B 2071/0027; A63B 2071/0683; A63B 2220/52; A63B 2220/803; A63B 2220/806; A63B 2225/20; A63B 2225/50; A63B 2244/18–2244/24; G06F 3/01; G06F 3/41; G06F 3/11; G06F 3/16; A61B 5/103; G08B 23/00; H04N 7/18; G06K 9/00; G09B 19/0015; A61H 2201/5012–2201/5097
USPC ............ 340/4.1, 573.1, 573.7; 348/77; 482/8, 482/142; 345/156; 600/595
See application file for complete search history.

(56) References Cited

U.S. PATENT DOCUMENTS 5,807,111 A 9/1998 Schrader
6,066,075 A 5/2000 Poulton
(Continued)

FOREIGN PATENT DOCUMENTS

GB 2460278 A 11/2009

OTHER PUBLICATIONS

International Search Report and Written Opinion for PCT International Application No. PCT/US2011/051913 mailed Feb. 13, 2012.
(Continued)

*Primary Examiner* — Lun-Yi Lao
*Assistant Examiner* — Johny Lau
(74) *Attorney, Agent, or Firm* — Brundidge & Stanger, P.C.

(57) ABSTRACT

In one example of a user-guidance system, a remote control may be configured to guide a user's physical movements by transmitting movement signals that are to be translated into haptic instructions, and cooperative actuators may be configured to be worn by the user to translate the movement signals received from the remote control into the haptic instructions. The movement signals may be translated into the haptic instructions for physical movements of any limb or extremity of the user in either of a vertical direction or a horizontal direction; after the first movement signal, the movement signals may be transmitted prior to completion of an immediately previous physical movement; and the movement signals may include horizontal and vertical directional signal components that indicate the horizontal and vertical direction for the user's next physical movement. The haptic instructions that are translated from the horizontal and vertical directional signal components may differ in either duration or magnitude. The movement signals may include horizontal directional signal components that indicate the horizontal direction for the user's next physical movement, and the haptic instructions that are translated from the horizontal directional signal components may differ in either duration or magnitude.

31 Claims, 8 Drawing Sheets

(51) Int. Cl.
      *A61H 3/06*      (2006.01)
      *A63B 71/00*     (2006.01)
      *A63B 71/06*     (2006.01)

(52) U.S. Cl.
      CPC ...... *G09B 19/0015* (2013.01); *A61H 2003/063* (2013.01); *A61H 2201/5012* (2013.01); *A61H 2201/5061* (2013.01); *A61H 2201/5064* (2013.01); *A61H 2201/5092* (2013.01); *A61H 2201/5097* (2013.01); *A63B 2071/0027* (2013.01); *A63B 2071/0683* (2013.01); *A63B 2220/52* (2013.01); *A63B 2220/803* (2013.01); *A63B 2220/806* (2013.01); *A63B 2225/20* (2013.01); *A63B 2225/50* (2013.01); *A63B 2244/18* (2013.01); *A63B 2244/19* (2013.01); *A63B 2244/24* (2013.01)

(56) References Cited

U.S. PATENT DOCUMENTS

| | | | |
|---|---|---|---|
| 6,275,213 B1 | 8/2001 | Tremblay et al. | |
| 6,285,379 B1 | 9/2001 | Gallery | |
| 6,320,496 B1 | 11/2001 | Sokoler et al. | |
| 6,353,773 B1 | 3/2002 | Takenaka | |
| 6,671,618 B2 | 12/2003 | Hoisko | |
| 6,864,877 B2 | 3/2005 | Braun et al. | |
| 7,788,032 B2 | 8/2010 | Moloney | |
| 7,839,269 B2 | 11/2010 | Steger et al. | |
| 7,855,657 B2 | 12/2010 | Doemens et al. | |
| 7,864,991 B2 | 1/2011 | Espenlaub et al. | |
| 2006/0109201 A1 | 5/2006 | Ryoo et al. | |
| 2006/0286972 A1 | 12/2006 | Kates | |
| 2007/0016425 A1 | 1/2007 | Ward | |
| 2007/0073196 A1* | 3/2007 | Tanaka et al. | 600/595 |
| 2007/0129907 A1 | 6/2007 | Demon | |
| 2007/0213930 A1 | 9/2007 | Sakamoto et al. | |
| 2007/0260418 A1 | 11/2007 | Ladetto et al. | |
| 2008/0120029 A1 | 5/2008 | Zelek et al. | |
| 2009/0062092 A1* | 3/2009 | Mortimer | A63B 24/00 482/142 |
| 2009/0088659 A1 | 4/2009 | Graham et al. | |
| 2009/0260426 A1 | 10/2009 | Lieberman et al. | |
| 2010/0004860 A1 | 1/2010 | Chernoguz et al. | |
| 2010/0117837 A1* | 5/2010 | Stirling | A61B 5/1127 340/573.1 |
| 2011/0009241 A1* | 1/2011 | Lane et al. | 482/8 |
| 2012/0075196 A1* | 3/2012 | Ashbrook et al. | 345/173 |

OTHER PUBLICATIONS

Azimian, H., "A Survey on Visual Object Tracking Algorithms," Control Engineering Master Seminar, pp. 1-55 (2005).
"AJ the Blind Tango Dancer," accessed at http://www.youtube.com/watch?v=94NoViVkKx4, accessed on Dec. 30, 2014, pp. 1-2.
"Blind bike trials video," accessed at http://www.youtube.com/watch?v=9f7FIQhDihM, accessed on Dec. 30, 2014, pp. 1-2.
"Blind Rider," accessed at http://www.youtube.com/watch?v=B4xUijM1jpU, accessed on Dec. 30, 2014, pp. 1-2.
"Computer-Based Navigation System for Blind People," accessed at https://web.archive.org/web/20090917075013/http://www.axistive.com/computer-based-navigation-system-for-blind-people.html, Published on Jun. 27, 2007, pp. 1-3.
"da Blind Surfer of Kaua'l," accessed at http://www.youtube.com/watch?v=eZj5qEDeaT8, accessed on Dec. 30, 2014, pp. 1-2.
"Facing the Waves," accessed at http://www.youtube.com/watch?v=5sIRTg3allQ, accessed on Dec. 30, 2014, pp. 1-2.
"Lead and follow," accessed at https://web.archive.org/web/20110608191633/http://en.wikipedia.org/wiki/Lead_and_follow, last modified on Apr. 26, 2011, pp. 1-4.
"Motion capture," accessed at https://web.archive.org/web/20100715231753/http://www.search.com/reference/Motion_capture, accessed on Dec. 23, 2014, pp. 1-9.
"RG, Robotic guide for the blind, Guides a visually impaired individual," accessed at http://www.youtube.com/watch?v=TMvio63yoJs, accessed at Dec. 30, 2014, pp. 1-2.
"Sports and Activity Rules for those with Visual Impairments," accessed at https://web.archive.org/web/20110209121154/http://www.recreationtherapy.com/tx/txblind.htm, accessed on Dec. 24, 2014, pp. 1-6.
"Wearable Interface using sensory illusion and distortion," accessed at https://web.archive.org/web/20100221070630/http://www.brl.ntt.co.jp/people/t-amemiya/research.html, accessed on Dec. 24, 2014, pp. 1-11.
"Weight transfer (dance move)," accessed at http://en.wikipedia.org/wiki/Weight_transfer_%28dance_move%29, last modified on Jul. 3, 2012, p. 1.
Amemiya, T., and Sugiyama, H., "Design of a Haptic Direction Indicator for Visually Impaired People in Emergency Situations," Computer Helping People With Special Needs, vol. 5105, pp. 1141-1144 (2008).
Amemiya, T., and Sugiyama, H., "Navigation in eight cardinal directions with pseudo-attraction force for the visually impaired," Systems, Man and Cybernetics, 2009. SMC 2009. IEEE International Conference on, pp. 27-32 (Oct. 11-14, 2009).
Cosetta., "Vibrating Body-Piercing Jewelry: Great Idea?," accessed at https://web.archive.org/web/20100430032747/http://inventorspot.com/articles/vibrating_bodypiercing_jewelry_great_idea_21197, accessed on Dec. 24, 2014, pp. 1-4.
Eaton, K., "Kinect Hacked to Control Humanoid Robot: First Steps to Avatar," accessed at https://web.archive.org/web/20110906004327/http://www.fastcompany.com/1713032/kinect-hacked-to-control-humanoid-robot-first-steps-to-avatar, Dated Dec. 29, 2010, pp. 1-2.
Ford, J., "Robot could guide humans through areas of low visibility," accessed at http://www.theengineer.co.uk/sectors/electronics/news/robot—could—guide—humans—through—areas—of—lowvisibility/1008224.article, Dated Apr. 8, 2011, pp. 1-2.
Hasenfratz, J.M., et al., "Real-Time Capture, Reconstruction and Insertion into Virtual World of Human Actors," Vision, Video, and Graphics, pp. 1-9 (2003).
Iselin, T., "Blind Skier's Edge Adaptive Ski Clinincs With Blind Adventurer Erik Weihenmayer," accessed at https://web.archive.org/web/20110910200205/http://www.blindskiersedge.org/, accessed on Dec. 23, 2014, p. 1.
Lundgren, M., "Path Tracking and Obstacle Avoidance for a Miniature Robot," Master Thesis, pp. 1-51 (2003).
MacDonald, K., "Enjoying the Ride Without Seeing Where You're Going," accessed at https://web.archive.org/web/20110711062231/http://cityroom.blogs.nytimes.com/2010/10/22/enjoying-the-ride-without-seeing-where-youre-going/, posted on Oct. 22, 2010, pp. 1-12.
Mayerhofer, B., et al., "Odilia—A Mobility Concept for the Visually Impaired," Computers Helping People with Special Needs, vol. 5105, pp. 1109-1116 (2008).
Mori, H., and Kotani, S., "Robotic travel aid for the blind: HARUNOBU-6," Proc. 2nd Euro. Conf. Disability, Virtual Reality & Assoc. Tech, pp. 193-202 (1998).
neilC, "Kinect Motion Control of Virtual World Avatars," accessed at http://web.archive.org/web/20110812152607/http://blog.knowsense.co.uk/blog/_archives/2011/1/20/4731040.html, posted on Jan. 20, 2011, pp. 1-2.
Sandhana, L.,"GPS to Help the Blind Navigate," accessed at https://web.archive.org/web/20110831094920/http://www.wired.com/medtech/health/news/2003/06/59174, Dated Jun. 14, 2003, pp. 1-2.
Springer, S., "Chasing glory they can feel, not see," acceessed at http://www.boston.com/sports/specials/marathon/articles/2008/04/20/chasing_glory_they_can_feel_not_see/, Dated Apr. 20, 2008, pp. 1-2.
Trafton, A., "Feeling the way" accessed at https://web.archive.org/web/20100330094541/http://web.mit.edu/newsoffice/2009/touch-map.html, Dated Nov. 23, 2009, pp. 1-3.
Wieser, M., et al., "A Navigation Concept for Visually Impaired Pedestrians in an Urban Environment," Vermessung & Geoinformation, pp. 159-165 (Feb. 2007).

(56) References Cited

OTHER PUBLICATIONS

Wolff, K., and Nordin, P., "Learning Biped Locomotion from First Principles on a Simulated Humanoid Robot using Linear Genetic Programming," Proceeding GECCO'03 Proceedings of the 2003 international conference on Genetic and evolutionary Computation: PartI, pp. 495-506 (2003).

Zillner, S., et al., "The Right Move" —A Concept for a Video-Based Choreography Tool, Conference on Photogrammatic Computer Vision, pp. 1-4 (Aug. 2002).

W. Heuten, et al., "Tactile Wayfinder: A Non-Visual Support System for Wayfinding", Proceedings: NordiCHI 2008, Oct. 20-22, 2008, pp. 172-181.

Robert W. Lindemen, "The Design and Deployment of a Wearable Vibrotactile Feedback System", Proc. of the 8th IEEE Int'l Symp. On Wearable Computers, Oct. 31-Nov. 3, 2004, Arlington, VA, USA, pp. 56-69.

"Is There in Truth No Beauty?",Wikipedia, http://en.wikipedia.org/wiki/Is_There_in_Truth_No_Beaut%3F, Jun. 6, 2011, pp. 1-3.

"A Wearable Haptic Navigation Guidance System" by S. Erthan, et al., Oct. 1998, pp. 164-165.

"Navigation for the Visually Handicapped: Going Beyond Tactile Cartography", R Dan Jacobson, Postgraduate Researcher, Institute of Earth Studies, University of Wales, Aberystwyth, 1994, pp. 78-85.

"Haptic Navigation in Mobile Context" by H. Venesvirta., Dec. 2008, pp. 1-16.

"Navigation and Information System for Visually Impaired People" by Kopecek, et al., May 1997.

"Body Awareness and Dance Based Training for Persons with Acquired Blindness-Effects on Balance and Gait Speed", Abstract, Larsson et al., 2006.

International Search Report for PCT/US2011/022912 mailed Apr. 12, 2011.

\* cited by examiner

FRONT (K) STOP (L) JUMP/DUCK (M) RIGHT HAND SEARCH (N) LEFT HAND SEARCH

REAR

REMOTE MOVEMENT GUIDANCE

CROSS-REFERENCE TO RELATED APPLICATIONS

This application is the National Stage filing under 35 U.S.C. §371 of PCT Application Ser. No. PCT/US11/51913 filed on Sep. 16, 2011, and is related to U.S. application Ser. No. 13/129,745, filed on May 17, 2011, which is a U.S. National Stage filing under 35 U.S.C. §371 of PCT Application Ser. No. PCT/US11/22912, filed on Jan. 28, 2011. The disclosures of the aforementioned related applications are incorporated herein by reference in their entireties.

TECHNICAL FIELD

The implementations and embodiments described herein pertain generally to providing guidance for individuals who are visually impaired, i.e., those individuals who are blind or with significantly diminished visual capabilities, or whose vision is impaired due to environmental factors, for activities in which they could not otherwise participate without difficulty, as well as for individuals who are participating in interactive video games.

CROSS-REFERENCE TO RELATED APPLICATIONS

This Application is the National Stage filing under 35 U.S.C. §371 of PCT Application Ser. No. PCT/US11/51913 filed on Sep. 16, 2011. The disclosure of the PCT Application is hereby incorporated herein by reference in its entirety.

BACKGROUND

Guidance options for visually impaired people either involve significant reliance upon others, including other people or even animals, or restrict the pace and scope of the individual's movements. Thus, there are many physical and athletic activities for which participation by such individuals is problematic.

For instance, a visually-impaired person using a cane relies upon other people in his/her immediate vicinity to be cognizant and cooperative lest the cane inadvertently becomes as an obstruction, i.e., physical hazard, to those other people who may trip over or otherwise be impeded by the cane or even the visually-impaired person. Further, and particular to the visually-impaired person, the utility of the cane is limited to providing only an awareness of obstacles in the immediate vicinity of the visually-impaired person; and, inanimate objects are incapable of effecting the aforementioned cognizance and cooperation towards the visually-impaired person, thus proving to be a potential obstruction to the person using the cane. Consequently, the movements of the visually-impaired person using the cane are restricted in terms of pace and physical scope; further, participation in athletic activities is improbable.

A visually-impaired person relying upon a guide-dog is less reliant upon the cognizance and cooperation of other people in the vicinity of the visually-impaired person, relative to the person using a cane. However, the guide-dog-user is reliant upon, and therefore somewhat limited by, the guide-dog's training and subsequent guidance in familiar settings. Still, similar to the person using the cane, the person led by a guide-dog may be provided step-by-step guidance with regard to obstacles in his/her immediate vicinity, but a guide-dog is incapable of providing feedback regarding the landscape; and, thus, the pace and even the scope of the movements for the person led by a guide-dog are cautiously limited.

SUMMARY

In one example embodiment, a user-guidance system is generally described. In at least one of such embodiments, the system may include a remote control configured to guide a user's physical movements by transmitting movement signals, and cooperative actuators that may be configured to be worn by the user to translate the movement signals received from the remote control into haptic instructions. The movement signals may be translated into the haptic instructions for physical movements of any limb or extremity of the user in either of a vertical direction or a horizontal direction; after the first movement signal, the movement signals may be transmitted prior to completion of an immediately previous physical movement; and the movement signals may include directional signal components that indicate the horizontal and vertical direction for the user's next physical movement. The haptic instructions that are translated from the horizontal and vertical directional signal components may differ in either duration or magnitude. The movement signals may include horizontal directional signal components that indicate the horizontal direction for the user's next physical movement, and the haptic instructions that are translated from the horizontal directional signal components may differ in either duration or magnitude.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
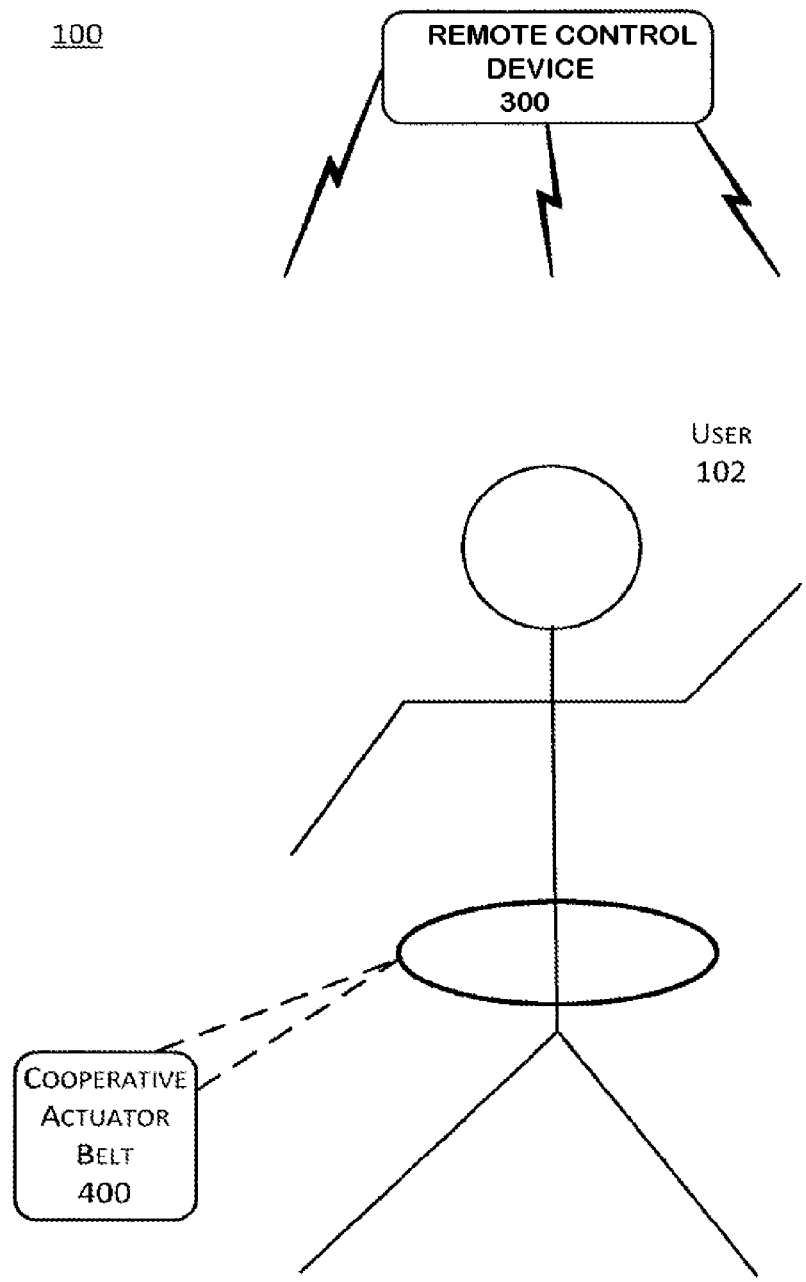
FIG. 1 shows an overview of an example guiding solution for a user in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an overview of an example guiding solution 100 for a user in accordance with at least some embodiments described herein.

Guiding solution 100 for guiding a user 102 may include, at least, a remote control device 300, which may be configured to provide movement signals to guide a user's physical movements that are to be translated into haptic instructions; and a cooperative actuator belt 400, which may be configured to be worn by user 102 to translate the movement signals received from remote control device 300 into the aforementioned haptic instructions and to actuate the haptic instructions to provide movement guidance for user 102.

User 102 may be a person who is visually-impaired due to, e.g., physical limitations or environmental factors, and in need of guidance from a person, application, or program capable of providing movement signals from remote control device 300. Examples of such physical limitations include diminished sight capabilities or complete blindness; and examples of such environmental factors include darkness, e.g., lack of light or heavy fog or smoke. Further, user 102 may be a visually impaired person who is engaging in activities that may not be feasible but for the remote movement guidance provided from remote control device 300. Such activities may include, but not be limited to, pointing, grabbing, walking, running, jumping, biking, skiing, skating, surfing, sailing, or horseback riding. Further still, user 102 may be a participant in a game or activity for which participation requires following guidance sent from remote control device 300, regardless of the sight capabilities of user 102, e.g., an interactive game or virtual training.

Remote control device 300 may be a processor-implemented device, including but not limited to a hand-held controller, smart phone, or GPS device, which may be utilized to receive or generate and transmit movement signals that are to be translated into haptic instructions to guide physical movements of user 102. In at least one embodiment of remote movement guidance, the transmitted movement signals may be generated by the activation of activator buttons, activator switches, or other forms of activators on remote control device 300 typically, but not exclusively, by a person other than user 102. In even further embodiments of remote movement guidance, the transmitted movement signals may be generated by an application or program residing on a storage medium corresponding to remote control device 300.

In the former example scenario, the operator of remote control device 300 may observe or monitor the movements and surrounding environment of user 102, and activate the appropriate activator buttons, activator switches, or other forms of activators on remote control device 300, all within the context of an activity in which user 102 is engaged. Thus, the operator of remote control device 300 may facilitate remote movement guidance for user 102 in real-time.

In another example scenario, a guide may have a series of sensors, e.g., visual sensor and weight/motion sensors, attached thereto. The visual sensor may include a video camera, e.g., web-cam, and feedback mechanism to provide visual data, which may be factored into the calculation of instructions for a next physical movement for user 102, transmitted via remote control device 300.

Weight sensors may be utilized to measure the current weight disposition of the guide. More specifically, weight/motion sensors, attached to limbs and extremities of the guide, may each be embedded with at least an angle detector and a feedback mechanism to provide data regarding the weight disposition of the guide, which may be used to determine an appropriate next movement for user 102, also transmitted via remote control device 300.

In accordance with at least the foregoing example scenario, remote control device 300 may receive information from the aforementioned sensors, e.g., visual sensors and/or weight sensors, attached to the guide, calculate an appropriate next physical movement for user 102, and activate the appropriate activator buttons, activator switches, or other activators on remote control device 300, or otherwise relay the translated movement signals to user 102 who is wearing either actuators corresponding to the sensors adorning the guide or cooperative actuator belt 400.

In yet another example scenario, the operator of remote control device 300 may observe or monitor user 102 from a close distance or remotely, e.g., by video, or such monitoring of user 102 may be performed by a software and/or firmware application or program. The operator of remote control device 300 may activate activator buttons, activator switches, or other forms of activators on remote control device 300 to transmit movement signals in a real-time fashion. Though such timeliness may vary from one embodiment to another, at least one embodiment may include movement signals being transmitted within a predetermined amount of time prior to completion of the immediately prior physical movement by user 102. Such implementation of timeliness may be applicable to physical movements after the first physical movement. Further, for all of the embodiments described herein, the implementation of timeliness may include a predetermined waiting time, by which the transmitted instructions are for the user to prepare for an upcoming physical movement.

Alternatively, the activation of activator buttons, activator switches, or other forms of activators on remote control device 300, or the generation of movement signals to be transmitted from remote control device 300, may be implemented by an application or program that is stored in a storage medium on or accessible by remote control device 300 or that is received at remote control device 300 from an external source to which remote control device 300 is communicatively coupled.

For example, remote control device 300 may store therein, or otherwise have access to, an application or program that includes pre-recorded movement signals that are to be translated into haptic instructions that guide physical movements of user 102 over a predetermined course, such as in a controlled environment, e.g., virtual training or simulation exercise or a prepared path. Starting points and beginning movements may be scripted for such scenarios, but the remote movement guidance provided by the pre-recorded movement signals is intended to guide physical movements for user 102 without incident. In this example scenario, user 102 may physically possess remote control device 300 when the movement signals transmitted from remote control device 300 are prerecorded and included in an application or program, although the example embodiment may still be implemented with another person physically possessing remote control device 300.

Alternatively, an application or program stored in, or otherwise accessible by, remote control device 300 may be utilized in an example embodiment in which user guiding solution 100 is integrated within a gaming system. Accordingly, the operator of remote control device 300 may provide guidance to user 102, wearing cooperative actuator belt 400 or a collection of activators on limbs and extremities, to traverse a virtual environment for either entertainment or training purposes.

Cooperative actuator belt 400 may include multiple actuators that may each be embedded with at least a haptic device to provide at least one timely haptic stimulus that may guide an appropriate next physical movement for user 102. For example, the cooperative actuators may provide user 102 with one or more haptic stimulus in the form of, e.g., coordinated pulses that may differ in placement, duration, quantity, and/or even intensity that may be interpreted by user 102 as a guidance instruction for a next physical movement. Thus, differences among the aforementioned pulses may be attributed to specific haptic instructions for different lengths and angles of horizontal and vertical movements or combinations thereof. Non-limiting examples of the actuators may include haptic directional indicators that may be configured to provide tactile stimuli that may be localized on a belt 400 and further customized in accordance with any of placement, intensity, duration, quantity, or any combination thereof.

Figure 2:
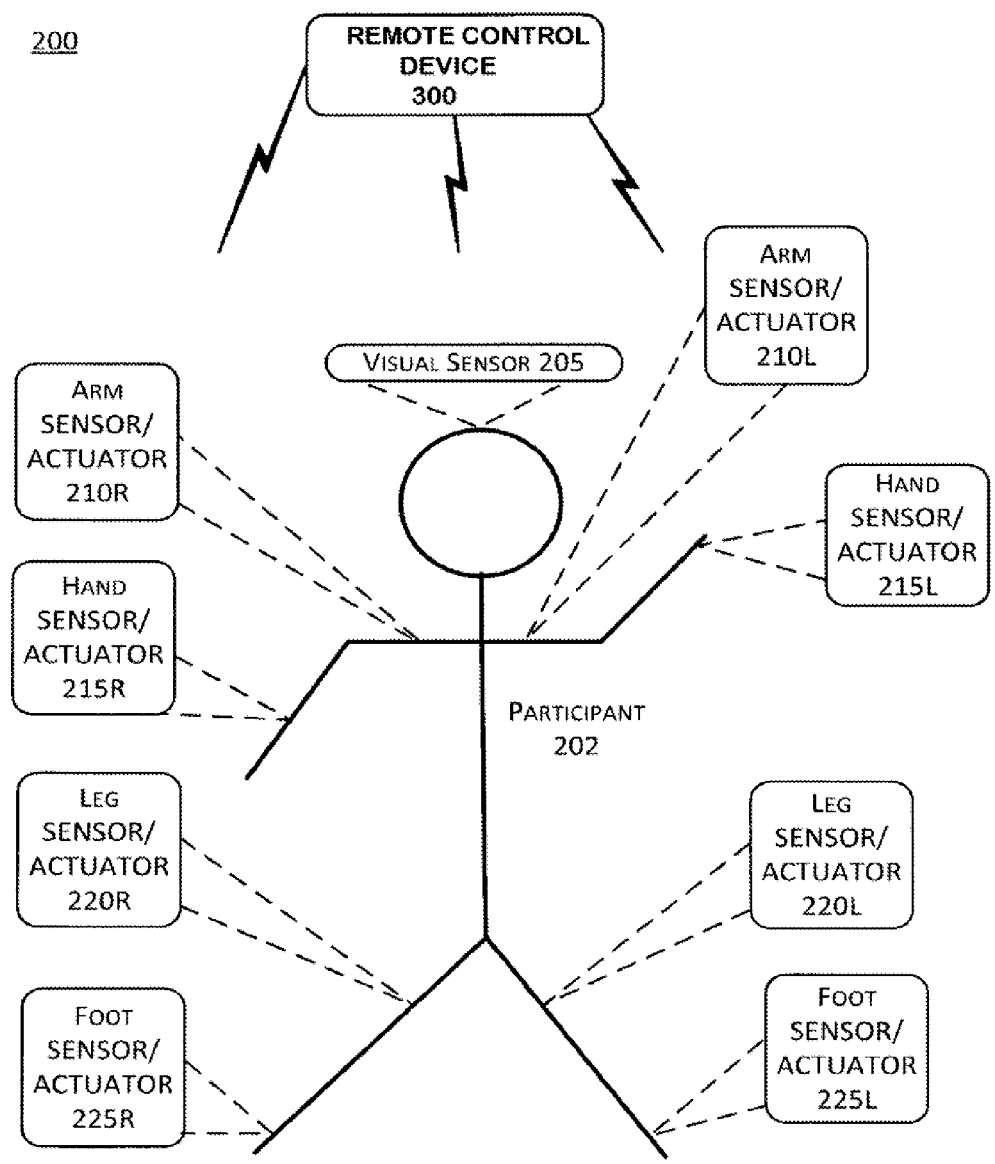
FIG. 2 shows an example operator-based configuration including a remote control device, which may be included as part of at least one example embodiment of a guiding solution as described herein.

FIG. 2 shows an example operator-based configuration 200 including remote control device 300, which may be included as part of at least one example embodiment of guiding solution 100 as described herein.

Configuration 200 may be implemented by, at least, a guide and a user. Thus, participant 202 may be regarded as a generic designation of a person who is adorned with the configuration of sensors and actuators, of which respective sensors and actuators may be implemented in combination or independently of one another, as described herein.

First, configuration 200 is described when participant 202 is a guide.

Configuration 200 for guide 202 may include sensors, e.g., visual sensor 205 and weight/motion sensors 210L, 210R, 215L, 215R, 220L, 220R, 225L, and 225R, attached thereto. Throughout the present description, sensors 210L, 210R, 215L, 215R, 220L, 220R, 225L, and 225R may be respectively referred to as "sensors 210," "sensor 215," "sensors 220," or "sensors 225," particularly when describing the utility of the sensors themselves and, therefore, reference to the quantity or placement thereof is not paramount.

Again, in at least one example embodiment of configuration 200, participant 202 may be regarded as guide 202 whose physical movements are translated into movement signals to be transmitted to a similar configuration of actuators adorning a user, via remote control device 300.

Configuration 200 may include visual sensor 205, which may include a video camera, e.g., web-cam, and feedback mechanism to provide visual data, which may be factored into the calculation of instructions for a next physical movement for user 202, to a decision module associated with remote control device 300.

Visual sensor 205 may be utilized to gather visual data regarding the physical surroundings of guide 202, providing, in essence, a "birds-eye" view from the perspective of a user. More specifically, visual sensor 205 may include a video camera, e.g., web-cam, and feedback mechanism to provide visual data regarding the physical surroundings of guide 202, which may be factored into the calculation of instructions by the decision module associated with remote control device 300 for a next movement of the user. Movements of guide 202 include, by way of example and not limitation, a walking stride, a running stride, a stride up or down, e.g., a curb or a step, a hop or jump, or the like, or even any combination thereof, or other movements associated with pointing, grabbing, walking, running, jumping, biking, skiing, skating, surfing, sailing, horseback riding, or interactive video games.

Alternatively, visual sensor 205 may incorporate, or altogether be replaced by, a sonar-detecting device that may be utilized to provide sonar-based data regarding the physical surrounding of guide 202, which may also be factored into the calculations of the instructions by the decision module corresponding to remote control device 300 for a next movement of user 202.

Even further, visual sensor may be implemented in a handheld device, e.g., smartphone or even remote control device 300, which is in the possession of guide 202.

Weight/motion sensors 210, 215, 220, and 225 may be utilized to measure the current weight disposition and movements of guide 202. More specifically, weight sensors, attached to limbs and extremities of guide 202, may each be embedded with at least an angle detector and a feedback mechanism to also provide data regarding the weight disposition of guide 202, which may be used to determine an appropriate next movement for the user, to the decision module associated with remote control device 300. More particularly, physical movements, including weight disposition, angular disposition, velocity, etc., executed by guide 202 may be transmitted to remote control device 300, at which the physical movements may be translated into movement signals by the decision module and then transmitted to user 202.

The feedback mechanism embedded within sensors 205, 210, 215, 220, and 225 may be communicatively coupled to remote control device 300, and therefore the decision module associated therewith, via a short-range communication connection such as, e.g., Bluetooth or Radio Frequency (RF). Further, examples of remote control device 300, in accordance with the current example embodiment, may include but not be limited to a computer, gaming console, or smartphone. Further still, particularly for a smartphone configured as remote control device 300, remote control device 300 may be in the physical possession of either guide 202 or the user thereof.

Additionally, definitions for variations of the movement signals translated from the physical movements executed by guide 202 to denote the variations in depth, angle, magnitude, velocity, etc., may be predefined and, therefore translated into movement signals by the decision module associated with remote control device 300 in real time.

Further, the present description of, and references to, visual sensor 205 and weight/motion sensors 210, 215, 220, and 225 is by way of example only, as they may vary in quantity, placement, or even manner of placement on guide 202 or a user.

As depicted in FIG. 2, weight/motion sensors 210, 215, 220, and 225 may be configured to be disposed on the respective arms, hands, legs, and feet of guide 202. As examples, the weight/motion sensors may be attached to guide 202, or user 202 alternatively as follows:

Left arm sensor 210L;
Right arm sensor 210R;

Left hand sensor 215L;
Right hand sensor 215R;
Left leg sensor 220L;
Right leg sensor 220R;
Left foot sensor 225L; and
Right foot sensor 225R.

Of course such configuration of sensors is by way of example only. Alternative embodiments may further include, for example, multiple sensors for upper and lower portions of legs and arms, and multiple sensors around various portions of the upper torso, e.g., waist and chest, or other body parts. Thus, the illustrated and described embodiments are merely exemplary.

Configuration 200 may utilized in multiple environments, as participant 202 may be implemented as either guide 202 or user 202, including, but not limited to, pointing, grabbing, walking, running, jumping, biking, skiing, skating, surfing, sailing, horseback riding, or interactive video games.

Further, as set forth above, configuration 200 may be implemented by, at least, a guide and a user. Thus, configuration 200 is described below when participant 202 is a user in, as examples only, an interactive gaming or virtual training environment.

Configuration 200 for user 202 may include sensors, e.g., visual sensor 205 and actuators 210L, 210R, 215L, 215R, 220L, 220R, 225L, and 225R, attached thereto. Throughout the present description, actuators 210L, 210R, 215L, 215R, 220L, 220R, 225L, and 225R may be respectively referred to as "actuators 210," "actuators 215," "actuators 220," or "actuators 225," particularly when describing the utility of the actuators themselves and, therefore, reference to the quantity or placement thereof is not paramount.

Again, in at least one example embodiment of configuration 200, participant 202 may be regarded as user 202 whose physical movements are instructed by movement signals transmitted, via remote control device 300, based on movements by a guide adorned with a similar configuration of sensors, e.g., visual sensor and weight/motion sensors.

Configuration 200 may include visual sensor 205, which may include a video camera, e.g., web-cam, and feedback mechanism to provide visual data, which may provide visual feedback from the perspective of user 202, to a decision module associated with remote control device 300.

Visual sensor 205 may be utilized to gather visual data regarding the physical surroundings of user 202, providing, in essence, a "birds-eye" view from the perspective of user 202. More specifically, visual sensor 205 may include a video camera, e.g., web-cam, and feedback mechanism to provide visual data regarding the physical surroundings of user 202, which may be factored into the calculation of instructions for a next movement of the user.

Alternatively, visual sensor 205 may incorporate, or altogether be replaced by, a sonar-detecting device that may be utilized to provide sonar-based data regarding the physical surrounding of user 202, which may also be factored into the calculations of the instructions for a next movement of user 202.

Even further, visual sensor may be implemented in a handheld device, e.g., smartphone or even remote control device 300, which is in the possession of user 202.

Actuators 210, 215, 220, and 225 may be worn on limbs and extremities of user 202, to provide guidance or directions for physical movements, including weight disposition, angular disposition, velocity, etc., for user 202. Actuators 210, 215, 220, and 225 may be processor-implemented devices that may each be embedded with at least a haptic device to provide timely guidance instructions for an appropriate next movement for user 202. For example, actuators 210, 215, 220, and 225 may provide user 202 with one or more haptic signals in the form of, e.g., coordinated pulses that may differ in placement, duration, quantity, and/or intensity, that may be interpreted by user 202 as a guidance instruction for a next physical movement. Thus, differences among the aforementioned coordinated pulses may be attributed to specific haptic instructions for different lengths and angles of horizontal and vertical movements or combinations thereof.

Figure 4:
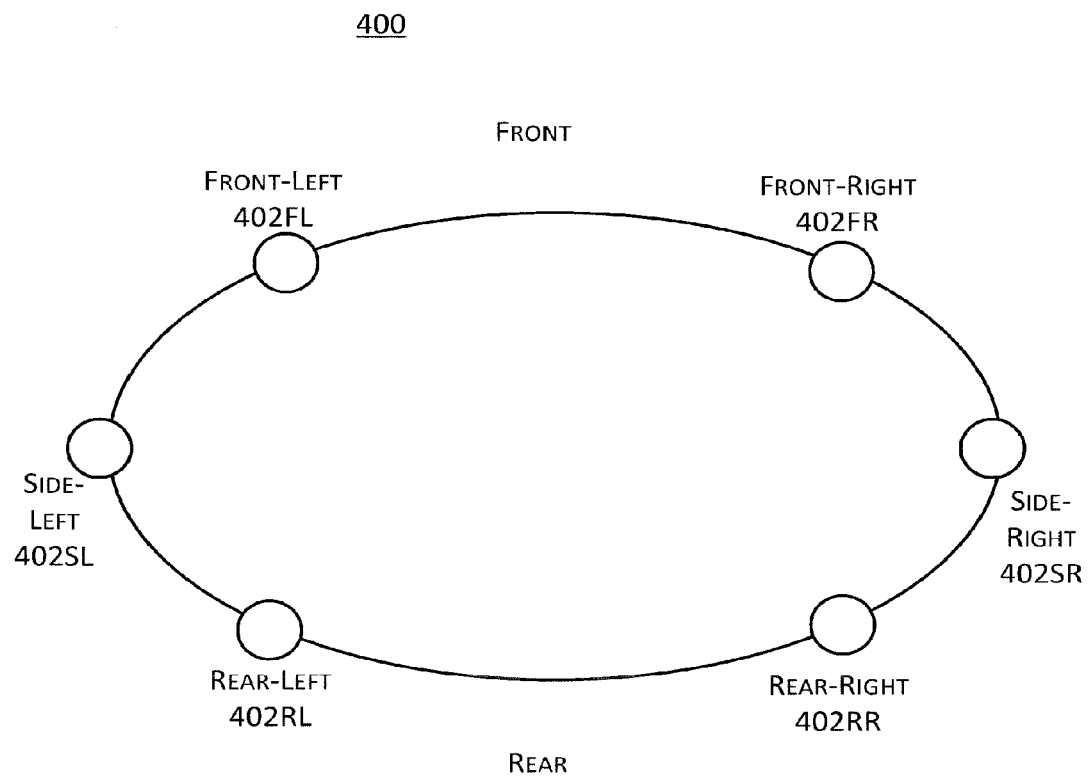
FIG. 4 shows an example configuration of cooperative actuators, which may be included in at least one example embodiment of a guiding solution as described herein.

In at least one alternative example embodiment, actuators 210, 215, 220, and 225 may be adorned upon user 202 in the form of cooperative actuator belt 400 as described herein with regard to at least FIG. 4.

Non-limiting examples of actuators 210, 215, 220, and 225 may include haptic directional indicators that may be configured to provide tactile stimuli that may be localized on a device and further customized in accordance with any of placement, intensity, duration, quantity, or any combination thereof.

Actuators 205, 210, 215, 220, and 225 may be communicatively coupled to remote control device 300, and therefore the decision module associated therewith, via a short-range communication connection such as, e.g., Bluetooth or Radio Frequency (RF). Further, examples of remote control device 300, in accordance with the current example embodiment, may include but not be limited to a computer, gaming console, or smartphone. Further still, particularly for a smartphone configured as remote control device 300, remote control device 300 may be in the physical possession of either user 202 or the guide.

Further, the present description of, and references to, visual sensor 205 and cooperative actuators 210, 215, 220, and 225 is by way of example only, as they may vary in quantity, placement, or even manner of placement on a guide or user 202.

Thus, as depicted in FIG. 2, actuators 210, 215, 220, and 225 may be configured to be disposed on the respective arms, hands, legs, and feet of user 202. As examples, the cooperative actuators may be attached to user 202 alternatively as follows:

Left arm actuator 210L;
Right arm actuator 210R;
Left hand actuator 215L;
Right hand actuator 215R;
Left leg actuator 220L;
Right leg actuator 220R;
Left foot actuator 225L; and
Right foot actuator 225R.

Of course such configuration of actuators is by way of example only. Alternative embodiments may further include, for example, multiple actuators for upper and lower portions of legs and arms, and multiple actuators around various portions of the upper torso, e.g., waist and chest. Thus, the illustrated and described embodiments are merely exemplary.

Even further, configuration 200 may be applicable to participant 202 being both guide and user.

Thus, configuration 200 for guide/user 202 may also include combined sensors/actuators, e.g., visual sensor 205 and weight/motion sensors/actuators 210L, 210R, 215L, 215R, 220L, 220R, 225L, and 225R, attached thereto. Throughout the present description, sensors/actuators 210L, 210R, 215L, 215R, 220L, 220R, 225L, and 225R may be respectively referred to as "sensors/actuators 210," "sensors/actuators 215," "sensors 220," or "sensors/actuators 225," particularly when describing the utility of the sensors/actuators themselves and, therefore, reference to the quantity or placement thereof is not paramount.

Configuration 200 for guide/user 202 may include visual sensor 205, which may include a video camera, e.g., web-cam, and feedback mechanism to provide visual data, which may be factored into the calculation of instructions for a next physical movement for guide/user 202, to a decision module associated with remote control device 300.

Visual sensor 205 may be utilized to gather visual data regarding the physical surroundings of user/guide 202, providing, in essence, a "birds-eye" view from the perspective of a guide/user 202. More specifically, visual sensor 205 may include a video camera, e.g., web-cam, and feedback mechanism to provide visual data regarding the physical surroundings of guide/user 202, which may be factored into the calculation of instructions for a next movement of guide/user 202, as determined by the decision module associated with remote control device 300. Movements of guide/user 202 include, by way of example and not limitation, a walking stride, a running stride, a stride up or down, e.g., a curb or a step, a hop or jump, or the like, or even any combination thereof, or other movements associated with pointing, grabbing, walking, running, jumping, biking, skiing, skating, surfing, sailing, horseback riding, or interactive video games.

Alternatively, visual sensor 205 may incorporate, or altogether be replaced by, a sonar-detecting device that may be utilized to provide sonar-based data regarding the physical surrounding of guide/user 202, which may also be factored into the calculations of the instructions for a next movement of guide/user 202, as determined by the decision module associated with remote control device 300.

Even further, visual sensor may be implemented in a hand-held device, e.g., smartphone or even remote control device 300, which is in the possession of guide/user 202.

Weight/motion sensors/actuators 210, 215, 220, and 225 may be utilized to measure the current weight disposition and movements of guide 202. More specifically, weight sensors, attached to limbs and extremities of guide/user 202, may each be embedded with at least an angle detector and a feedback mechanism to also provide data regarding the weight disposition of guide/user 202, which may be used to determine an appropriate next movement for guide/user 202, to the decision module associated with remote control device 300. Even more particularly, physical movements, including weight disposition, angular disposition, velocity, etc., executed by guide/user 202 may be transmitted to remote control device 300, at which the physical movements may be translated into movement signals by the decision module and then transmitted back to guide/user 202.

The feedback mechanism embedded within sensors/actuators 205, 210, 215, 220, and 225 may be communicatively coupled to remote control device 300, and therefore the decision module associated therewith, via a short-range communication connection such as, e.g., Bluetooth or Radio Frequency (RF). Further, examples of remote control device 300, in accordance with the current example embodiment, may include but not be limited to a computer, gaming console, or smartphone. Further still, particularly for a smartphone configured as remote control device 300, remote control device 300 may be in the physical possession of either guide 202 or the user thereof.

Additionally, definitions for variations of the movement signals translated from the physical movements executed by guide/user 202 to denote the variations in depth, angle, magnitude, velocity, etc., may be predefined and, therefore translated into movement signals by the decision module associated with remote control device 300 in real time.

As actuators, sensors/actuators 210, 215, 220, and 225 may provide guidance or directions for physical movements, including weight disposition, angular disposition, velocity, etc., for guide/user 202. Sensors/actuators 210, 215, 220, and 225 may be processor-implemented devices that may each be embedded with at least a haptic device to provide timely guidance instructions for an appropriate next movement for guide/user 202. For example, sensors/actuators 210, 215, 220, and 225 may provide guide/user 202 with one or more haptic signals in the form of, e.g., coordinated pulses that may differ in placement, duration, quantity, and/or intensity, that may be interpreted by user 202 as a guidance instruction for a next physical movement. Thus, differences among the aforementioned coordinated pulses may be attributed to specific haptic instructions for different lengths and angles of horizontal and vertical movements or combinations thereof.

Non-limiting examples of sensors/actuators 210, 215, 220, and 225 may include haptic directional indicators that may be configured to provide tactile stimuli that may be localized on a device and further customized in accordance with any of placement, intensity, duration, quantity, or any combination thereof.

Further, the present description of, and references to, visual sensor/actuator 205 and weight/motion sensors/actuators 210, 215, 220, and 225 is by way of example only, as they may vary in quantity, placement, or even manner of placement on guide/user 202.

Weight/motion sensors/actuators 210, 215, 220, and 225 may be configured to be disposed on the respective arms, hands, legs, and feet of guide 202. As examples, the weight/motion sensors may be attached to guide/user 202, as follows:

Left arm sensor/actuator 210L;
Right arm sensor/actuator 210R;
Left hand sensor/actuator 215L;
Right hand sensor/actuator 215R;
Left leg sensor/actuator 220L;
Right leg sensor/actuator 220R;
Left foot sensor/actuator 225L; and
Right foot sensor/actuator 225R.

Of course such configuration of sensors/actuators is by way of example only. Alternative embodiments may further include, for example, multiple sensors/actuators for upper and lower portions of legs and arms, and multiple sensors/actuators around various portions of the upper torso, e.g., waist and chest, and other body parts. Thus, the illustrated and described embodiments are merely exemplary.

Figure 3:
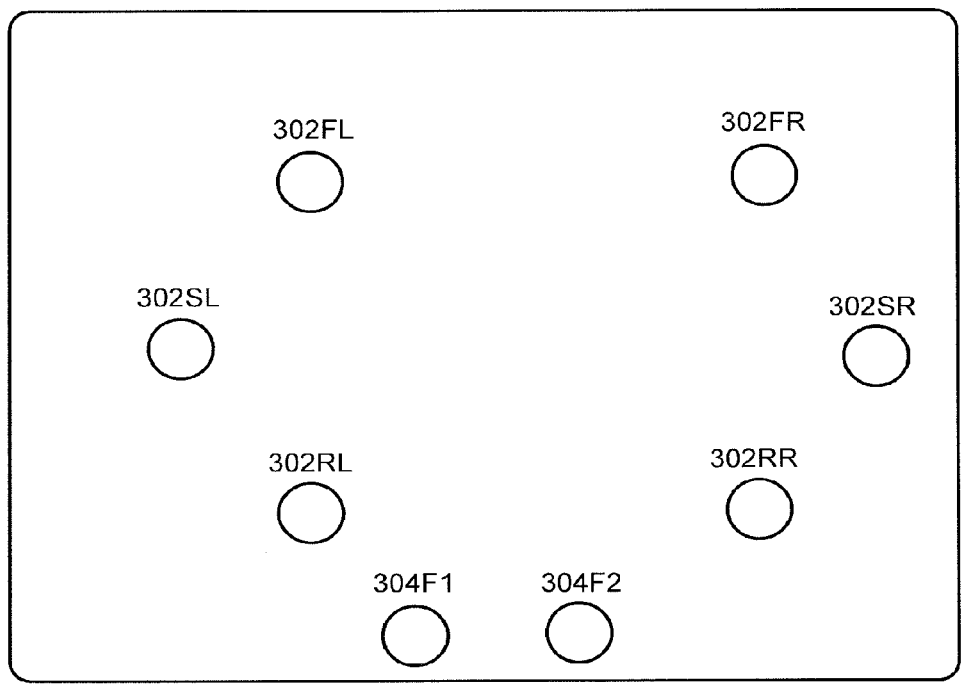
FIG. 3 shows an example remote control device, which may be included as part of at least one example embodiment of a guiding solution as described herein.

FIG. 3 shows an example remote control device 300, which may be included as part of at least one example embodiment of guiding solution 100 as described herein.

Remote control device 300 may include activator buttons front-left button 302FL, front-right button 302FR, side-left button 302SL, side-right button 302SR, rear-left button 302RL, and rear-right button 302RR. Function buttons 304F1 and 304F2 may be utilized, in combination with any of the aforementioned activator buttons, to vary the haptic instructions translated from the movement signals in terms of, e.g., intensity, duration, pulse patterns, etc.

Throughout the present description, buttons 302FL, 302FR, 302SL, 302SR, 302RL, and 302RR may be collectively referred to as "buttons 302" or "activator buttons 302," particularly when describing the utility of the buttons themselves and, therefore, reference to the quantity thereof is not paramount. Similarly, function buttons 304F1 and 304F2 may be collectively referred to as "function buttons 304."

Remote control device 300 may be a processor-implemented device, including but not limited to a hand-held controller or a smart phone, which may be utilized to transmit movement signals to cooperative actuator belt 400 that are to be translated into haptic instructions to guide physical movements for user 102. In at least one embodiment of remote movement guidance, the movement signals may be generated by the activation of activation buttons, activation switches, or other forms of activators on remote control device 300, typically by an operator of remote control device 300 other than user 102, although alternative implementations may include an application or program on remote control device 300 generating the movement signals to be transmitted.

In the example embodiment of FIG. 3, remote control device 300 may include six activator buttons and two function buttons. The six activator buttons may respectively correspond to actuators on cooperative actuator belt 400, and the two function buttons may be utilized to provide variance to the haptic instructions that are translated from the movement signals transmitted from remote control device 300 to a respective actuator on cooperative actuator belt 400.

For instance, when user 102 is engaging in an activity including, but not limited to, pointing, grabbing, walking, running, jumping, biking, skiing, skating, surfing, sailing, or horseback riding, the physical movements required of user 102 may vary in depth, angle, magnitude, velocity, etc., from one movement to the next. To provide movement signals that are to be translated into haptic instructions that include such variations, function buttons 304F1 and 304F2, either singularly or combined, together with at least one of the activator buttons 302, may be activated. Definitions for the variations of the movement signals to denote the variations in depth, angle, magnitude, velocity, etc., may be predefined and, therefore, learned by the operator of remote control device 300 and user 102 prior to implementation of remote guidance solution 100.

Regardless, in at least one example embodiment, the operator of remote control device 300 may observe or monitor the movements and surrounding environment of user 102 and activate the proper ones of activator buttons 302 and, if appropriate, function buttons 304 on remote control device 300, all within the context of an activity in which user 102 is engaged. Alternatively, the activation of activator buttons 302 and function buttons 304 on remote control device 300, or the generation of movement signals to transmitted from remote control device 300, may be implemented by an application or program that may be stored in a storage medium on remote control device 300 or that is received at remote control device 300 from an external source to which remote control device 300 is communicatively coupled.

FIG. 4 shows an example configuration of cooperative actuators, which may be included in at least one example embodiment of guiding solution 100 as described herein.

Cooperative actuator belt 400 may include actuators front-left actuator 402FL, front-right actuator 402FR, side-left actuator 402SL, side-right actuator 402SR, rear-left actuator 402RL, and rear-right actuator 402RR.

Throughout the present description, actuators 402FL, 402FR, 402SL, 402SR, 402RL, and 402RR may be collectively referred to as "actuators 402," particularly when describing the utility of the actuators themselves and, therefore, reference to the quantity thereof is not paramount. Further, actuators 402 may vary in quantity, placement, or even manner of placement on belt 400.

More particularly, FIG. 4 shows an example configuration of cooperative actuator belt 400 that may be worn by user 102 to receive movement signals from remote control device 300, which may then translated into haptic instructions by appropriate ones of the actuators corresponding to belt 400 for actuation. Further, just as the transmission of movement signals from remote control device 300 may be custom defined according to user preference, so may implementation of the resulting haptic instructions by the cooperative actuators 402 on belt 400. Thus, the examples of FIG. 3 and FIG. 4 are intended as example embodiments only, and are not intended to be inclusive of all possible implementations.

Further still, remote control device 300 and actuators 402 on belt 400 may be communicatively coupled via a short-range communication connection such as, e.g., Bluetooth or Radio Frequency (RF).

Actuators 402 may be processor-implemented devices that may each be embedded with at least a haptic device to provide timely guidance instructions for an appropriate next movement for user 102. For example, actuators 402 may provide user 102 with one or more haptic signals in the form of, e.g., coordinated pulses that may differ in placement, duration, quantity, and/or intensity, that may be interpreted by user 102 as a guidance instruction for a next physical movement. Thus, differences among the aforementioned coordinated pulses may be attributed to specific haptic instructions for different lengths and angles of horizontal and vertical movements or combinations thereof.

Non-limiting examples of actuators 402 may include haptic directional indicators that may be configured to provide tactile stimuli that may be localized on a device and further customized in accordance with any of placement, intensity, duration, quantity, or any combination thereof.

In at least one alternative embodiment, belt 400 may include a processor-implemented device to receive the transmitted movement signals, translate the movement signals into haptic instructions to be actuated at the appropriate one or more of actuators 402, which are disposed separately.

Figure 5A:
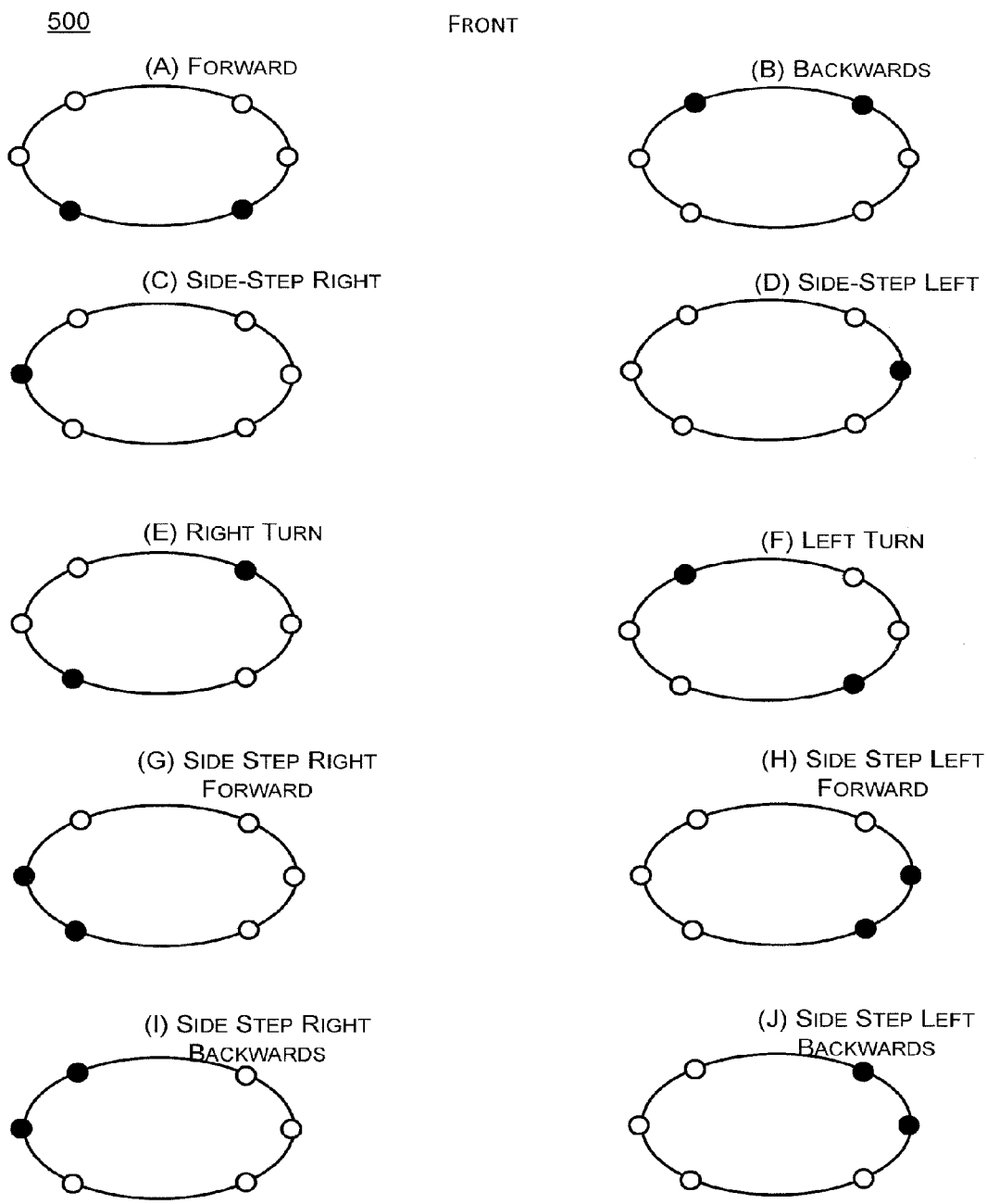
FIGS. 5A and 5B show examples of how the configuration of cooperative actuators, shown and described in accordance with FIG. 4, may be implemented in accordance with at least some embodiments described herein.
Figure 5B:
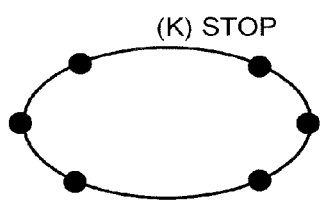
Figure 5B:
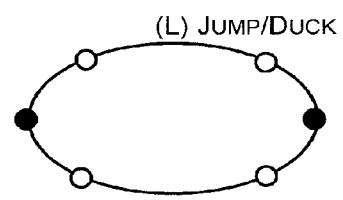
Figure 5B:
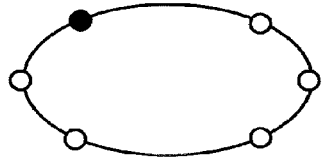
Figure 5B:
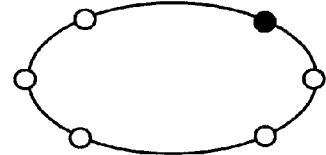

FIGS. 5A and 5B show examples 500(A)-500(N) of how the configuration of cooperative actuators 402, shown and described in accordance with FIG. 4, may be implemented in accordance with at least some embodiments described herein.

Just as the transmission of movement signals transmitted from remote control device 300 and the translation thereof at belt 400 may be custom defined according to user preference, so may actuation of the resulting haptic instructions by the cooperative actuators 402 on belt 400. Thus, the examples of FIG. 3, FIG. 4, and FIGS. 5A and 5B are intended as example embodiments only, and are not intended to be inclusive of all possible implementations.

Continuing with the example embodiments of FIG. 3 and FIG. 4, guidance in the form of movement signals may be provided for each step and/or directional physical movement taken by user 102, with the metes and bounds of such guidance being pre-defined prior to utilization of remote guidance solution 100. Thus, in at least one embodiment, for every physical movement to be taken by user 102, movement signals may be transmitted to cooperative actuator belt 400, at which the received movement signals may be translated to haptic instructions at or for appropriate ones of cooperative actuators 402. For each movement of user 102 subsequent to the first, an exemplary timing for transmitting the guidance instruction is immediately prior to completion of the previous movement by user 102. "Immediately," in accordance with the more than one embodiments contemplated herein, may be predetermined, e.g., to be within one second subsequent to transmission of the previous movement signal transmission. Alternatively, the movement signals may be transmitted from remote control device 300 to cooperative actuator belt 400 at regular predetermined intervals, e.g., every one second.

In at least one embodiment, when user 102 is wearing cooperative actuator belt 400 in a front-facing manner, the haptic instructions translated from the received movement signals may be actuated in a manner that is designed to "push" user 102 in an intended direction. The following, therefore at examples of haptic instructions, as translated by cooperative actuators 402, for guiding movements of user 102. More particularly, as depicted in FIG. 5, one or more of actuators 402FL, 402FR, 402SL, 402SR, 402RL, and 402RR may be darkened to depict a haptic instruction being actuated at one or more appropriate ones of actuators 402. These examples pertain to direction, and may be agnostic with regard to variations in depth, angle, magnitude, velocity, etc., pertaining to the movement guidance.

(A) Forward: 402RL and 402RR
(B) Backwards: 402FL and 402FR
(C) Side-Step Right: 402SL
(D) Side-Step Left: 402SR
(E) Right Turn: 402RL and 402FR
(F) Left Turn: 402RR and 402FL
(G) Side Step Right Forward: 402SL and 402RL
(H) Side Step Left Forward: 402SR and 402RR
(I) Side Step Right Backwards: 402FL and 402SL
(J) Side Step Left Backwards: 402FR and 402SR.

Further, FIG. 5B, more particularly, depicts examples of haptic instructions that provide further movement guidance to direct user 102:

(K) Stop: all of actuators 402FL, 402FR, 402SL, 402SR, 402RL, and 402RR
(L) Jump/Duck: 402SL and 402SR
(M) Right Hand Search
(N) Left Hand Search.

The physical movements guided by the movement signals transmitted by remote control device 300 and translated into haptic instructions by and for actuation at one or more of cooperative actuators 402, in the examples of 500(A)-500(L), may typically be applied to leg or foot movement. However, the example embodiments of remote movement guidance described herein are intended to be applicable to all limbs and extremities of user 102 and, therefore, as shown in the examples of 500(M) and 500(N), may also be applied to the hands of user 102. The implementation of various haptic instructions for any limb and/or extremity of user 102 may be left open to reconfiguration according to the preferences and/or needs of user 102 prior to utilization of remote guidance solution 100. For example, once movement signals have been transmitted to instruct arm and hand movements, e.g., instructions (M) and (N), then instructions (A)-(J) may be applicable to hand movements until further movement signals are transmitted to instruction leg and foot movements.

Further, the examples of FIGS. 5A and 5B may also contemplate activation of at least one of Function Buttons 304F1 and 304F2 on remote control device 300, depending upon predefined functionality thereof to affect variations in the movement guidance for user 102. That is, as the operator of remote control device 300 activates function buttons 304F1 and 304F2, either singularly or combined, together with at least one of the activator buttons 302, the resulting haptic instructions actuated by one or more of actuators 402 may inform user 102 of variations in depth, angle, magnitude, velocity, etc., for the next instructed physical movement. Such variances may be predefined and, therefore, learned by the operator of remote control device 300 and user 102 prior to utilization of remote guidance solution 100.

Figure 6:
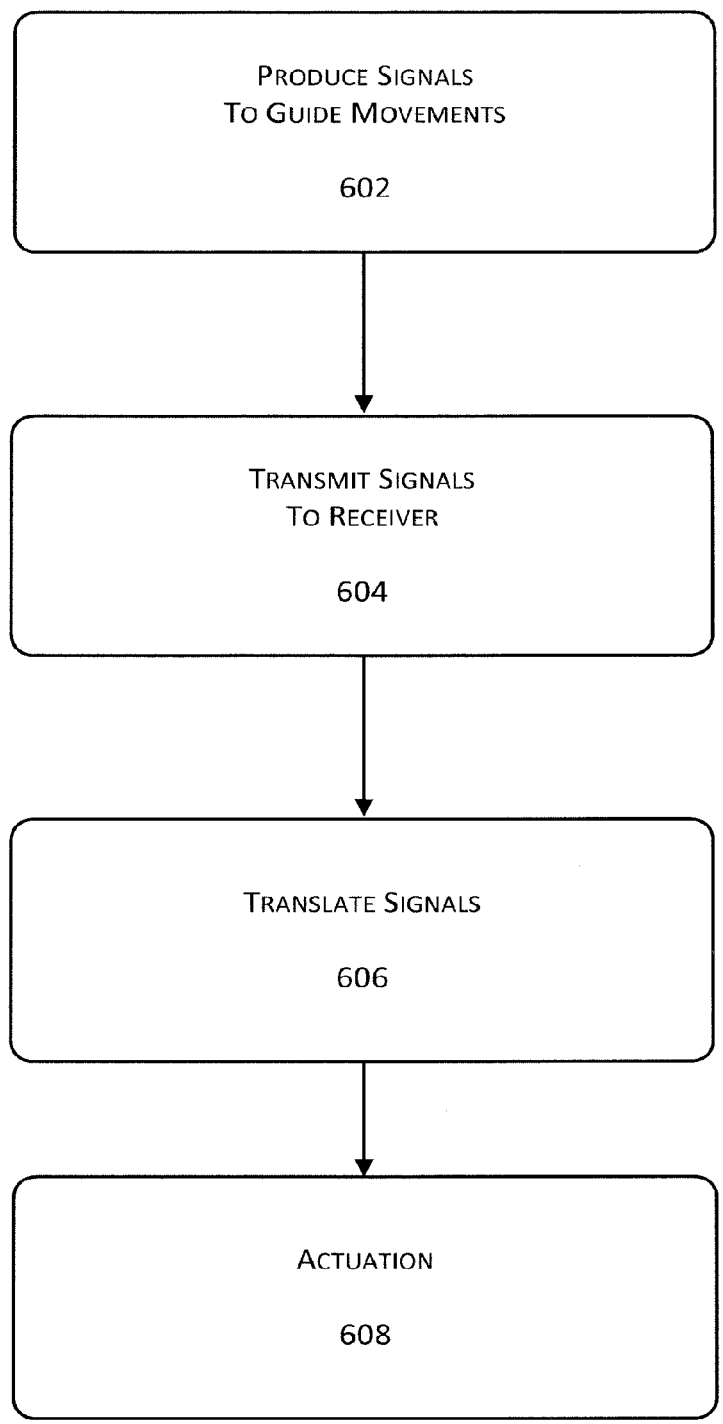
FIG. 6 shows a processing flow for an example guiding solution in accordance with at least some embodiments described herein.

FIG. 6 shows a processing flow 600 for an example guiding solution in accordance with at least some embodiments described herein.

More particularly, processing flow 600 describes sub-processes executed by various components that are part of guiding solution 100. However, processing flow 600 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Further, processing flow 600 may include one or more operations, actions, or functions, as illustrated by one or more of blocks 602, 604, 606, and 608. Although illustrated as discrete blocks, various blocks may be divided into additional blocks, combined into fewer blocks, or eliminated altogether, depending on the desired implementation. Moreover, the blocks in the FIG. 6 may be operations that may be implemented in hardware, software, or a combination thereof. In the context of software, the blocks represent computer-executable instructions that, when executed by one or more processors, cause one or more processors to perform the recited operations. Generally, computer-executable instructions include routines, programs, objects, components, data structures, and the like that cause the particular functions to be performed or particular abstract data types to be implemented.

First, processing flow 600 is described in accordance with configuration 200 illustrated, and described corresponding to FIG. 2.

Block 602 (Produce Signals to Guide Movements) may represent the generation of movement signals by guide 202 utilizing sensors 210, 215, 220, and 225 to be transmitted from remote control device 300, with the movement signals being generated by the decision module associated with remote control device 300. Block 602 may be followed by block 604.

Block 604 (Transmit Signals to Receiver) may represent the transmission of the movement signals translated by the decision module associated with remote control device 300 from the movement signals generated by sensors 210, 215, 220, and 225 from remote control device 300 to the actuators as depicted in FIG. 2 or, alternatively, on cooperative actuator belt 400 as depicted in FIGS. 1, 4A, 4B, and 5.

As a non-limiting example, remote control device 300 and actuators on user 202 may be communicatively coupled via a short-range communication connection such as, e.g., Bluetooth or Radio Frequency (RF). Block 604 may be followed by block 606.

Block 606 (Translate Signals) may represent one or more of actuators 210, 215, 220, and 225 receiving the movement signals transmitted from remote control device 300, and translating the received movement signals into timely haptic instructions that guide an appropriate next movement for the user. Block 606 may be followed by block 608.

Block 608 (Actuation) may refer to one or more of actuators 210, 215, 220, and 225 actuating the haptic instructions to provide movement guidance to user 202. Accordingly, the user may be guided directionally, for any limb or extremity, with movement guiding including variations in depth, angle, magnitude, velocity, etc.

As described above, and in alternative embodiments, processing flow 600 may be applicable to configuration 200 with guide 202 being a different person than user 202, as well as guide 202 and user 202 being the same person.

Secondly, processing flow 600 is described in accordance with guiding solution 100 illustrated, and described, corresponding to FIGS. 3-5.

Block 602 (Produce Signals to Guide Movements) may represent the generation of movement signals to be transmitted from remote control device 300, with the movement signals being generated by the activation of activator buttons 302, singularly or in combination with at least one of function buttons 304, or other forms of activators on remote control device 300. The activation of activator buttons 302, function buttons 304, or other forms of activators on remote control device 300 may typically be performed by a person other than user 102.

More particularly, the operator of remote control device 300 may activate the appropriate ones of activator buttons 302, function buttons 304, or other forms of activators on remote control device 300, all within the context of an activity in which user 102 is engaged and for which the operator observes or monitors user 102.

That is, the operator of remote control device 300 may observe or monitor user 102 from a close distance or remotely, e.g., by video. The operator of remote control device 300 may activate activator buttons 302, singularly or in combination with at least one of function buttons 304, or other forms of activators on remote control device 300 to transmit movement signals in a timely manner, e.g., within a predetermined amount of time prior to completion of the previous physical movement by user 102.

Alternatively, the activation of activator buttons 302, singularly or in combination with at least one of function buttons 304, or other forms of activators on remote control device 300, or the generation of movement signals to be transmitted from remote control device 300, may be implemented by an application or program that is stored in a storage medium on remote control device 300 or that is received at remote control device 300 from an external source to which remote control device 300 is communicatively coupled. Block 602 may be followed by block 604.

Block 604 (Transmit Signals to Receiver) may represent the transmission of the movement signals that result from the activation of activation buttons 302, singularly or in combination with at least one of function buttons 304, or from the application or program stored in a storage medium on remote control device 300, from remote control device 300 to cooperative actuator belt 400.

As a non-limiting example, remote control device 300 and actuators 402 on belt 400 may be communicatively coupled via a short-range communication connection such as, e.g., Bluetooth or Radio Frequency (RF). Block 604 may be followed by block 606.

Block 606 (Translate Signals) may represent one or more of cooperative actuators 402 on belt 400 receiving the movement signals transmitted from remote control device 300, and translating the received movement signals into timely haptic instructions that guide an appropriate next movement for user 102.

As set forth above, the movement signals may provide guidance for physical movements for user 102 in terms of directional movements, with variations in depth, angle, magnitude, velocity, etc. Accordingly, the translated haptic instructions may be implemented in the form of, e.g., pulses that may differ in placement, duration, quantity, and/or even intensity that may be interpreted by user 102 as a guidance instruction for a next physical movement. That is, differences among the aforementioned pulses may be attributed to specific guidance instructions for different lengths and angles of horizontal and vertical movements or combinations thereof.

The translation attributed to the processor-implemented actuators 402 may, alternatively, be executed by a separate processor-implemented device located on or near to belt 400 to receive and translate the movement signals into haptic instructions to be actuated at the appropriate one or more of actuators 402. Block 606 may be followed by block 608.

Block 608 (Actuation) may refer to one or more of actuators 402 actuating the haptic instructions to provide movement guidance to user 102 who is wearing belt 400. Accordingly, user 102 may be guided directionally, for any limb or extremity, with movement guiding including variations in depth, angle, magnitude, velocity, etc.

Accordingly, a remote guidance solution to enable users, including those who may be visually impaired, may be implemented to enable real-time movement guidance, thus enabling such users to participate in activities that may not otherwise be feasible.

Further, in alternative embodiments, user guidance solution 100 may be integrated within a gaming system that by which an operator of remote control device 300 provides guidance to user 102, wearing cooperative actuator belt 400, to traverse a virtual environment for either entertainment or training purposes. Thus, processing flow 600 may combine, substitute, or otherwise eliminate various elements and features depicted above in accordance with FIGS. 1-5.

Figure 7:
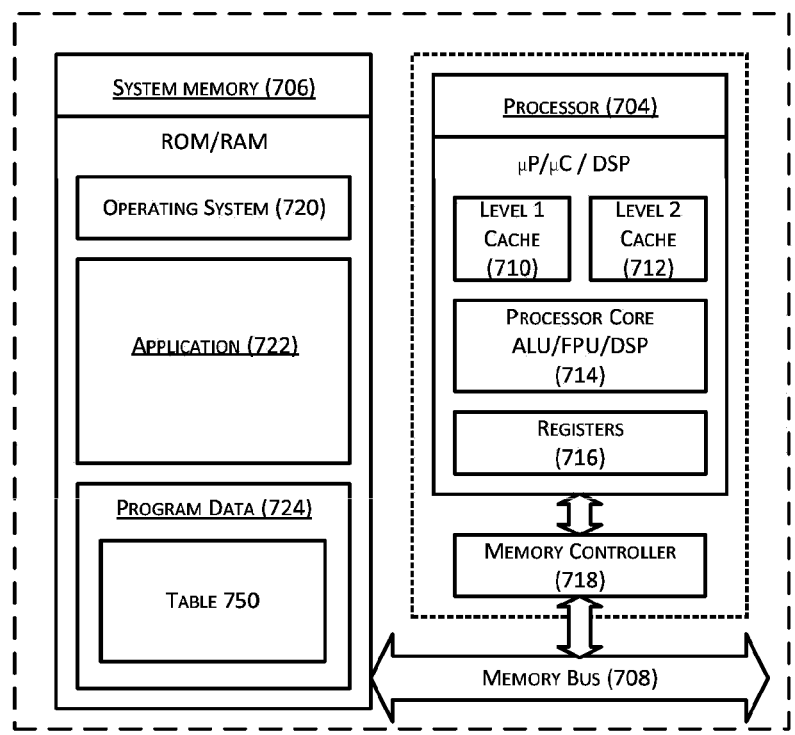
FIG. 7 shows a block diagram illustrating an example computing device by which various embodiments of the example solutions described herein may be implemented.

FIG. 7 shows a block diagram illustrating an example computing device 700 by which various embodiments of the example solutions described herein may be implemented.

More particularly, FIG. 7 shows an illustrative computing embodiment, in which any of the processes and sub-processes described herein may be implemented as computer-readable instructions stored on a computer-readable medium. The computer-readable instructions may, for example, be executed by a processor of a mobile unit, a network element, and/or any other computing device, particularly as applicable to the applications and/or programs described above corresponding to user guidance solution 100.

In a very basic configuration, a computing device 700 may typically include one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724.

Application 722 may include the aforementioned applications or programs that are arranged to perform the functions ascribed to remote control device 300 or any of a processor or any of actuators 402 on cooperative actuator belt 400, which are described previously with respect to FIGS. 1-6. Program data 724 may include a table 750, which may be useful for implementing actuation of appropriate actuators as described herein.

System memory 706 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for user guidance solution 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A remote movement guidance system, comprising:
   a visual sensor configured to gather visual data regarding physical surroundings of a user;
   weight/motion sensors configured to be attached to limbs and extremities of the user and configured to measure current weight disposition and movements of the user;
   a remote control device configured to guide the user's physical movements by transmitting real-time movement signals that are to be translated into haptic instructions,
   wherein the real-time movement signals include velocity signal components to indicate a change in velocity for the user's next physical movement, and
   wherein the real-time movement signals for the user's next physical movement are determined based at least in part on the visual data gathered by the visual sensor and the current weight disposition and movements of the user measured by the weight/motion sensors; and
   cooperative actuators configured to be worn by the user on a belt and to translate the movement signals, received from the remote control, into the haptic instructions that include one or more coordinated pulses that guide the user's next movements in an activity
   and to provide movement guidance in the form of a tactile stimulus,
   wherein the haptic instructions are for physical movements of any limb or extremity of the user in either of a vertical direction or a horizontal direction,
   wherein the movement signals, after a first of the movement signals, are transmitted prior to completion of an immediately previous physical movement to guide the user's physical movement,
   wherein the movement signals include horizontal and vertical directional signal components that indicate the horizontal and vertical direction for the user's next physical movement,
   wherein the haptic instructions translated from the horizontal and vertical directional signal components differ in either duration or magnitude,
   wherein the movement signals include horizontal directional signal components that indicate the horizontal direction for the user's next physical movement,
   wherein further the haptic instructions translated from the horizontal directional signal components differ in either duration or magnitude,
   and wherein the haptic instructions are reconfigurable for respective limbs or extremities according to user preferences.

2. The remote movement guidance system of claim 1, wherein the remote control is configured to be communicatively coupled to the actuator via a short-range communication system.

3. The remote movement guidance system of claim 1, wherein the remote control is further configured to transmit pre-recorded movement signals.

4. The remote movement guidance system of claim 1, wherein the user's activity includes pointing, grabbing, walking, running, jumping, biking, skiing, skating, surfing, sailing, or horseback riding.

5. The remote movement guidance system of claim 1, wherein the movement signals include angle signal components to indicate a change in angle magnitude for the user's next physical movement.

6. The remote movement guidance system of claim 1, wherein the belt is configured to include a front-left actuator, a front-right actuator, a rear-left actuator, a rear-right actuator, a side-left actuator, and a side-right actuator.

7. The remote movement guidance system of claim 6, wherein the cooperative actuators are configured to translate the horizontal and vertical directional signal components into the haptic instructions that include one or more coordinated pulses by at least one or more of the actuators worn on the belt to simulate a pushing action on the user.

8. The remote guidance system of claim 6, wherein the cooperative actuators are configured to translate the horizontal directional signal components into the haptic instructions that include one or more coordinated pulses by the left-side actuator and the right-side actuator on the belt.

9. The remote guidance system of claim 6, wherein the cooperative actuators are configured to translate the velocity signal components into the haptic instructions that include one or more coordinated pulses by at least three of the actuators worn on the belt.

10. The remote guidance system of claim 6, wherein the movement signals include angle signal components to indicate a change in angle magnitude for the user's next physical movement, and wherein further the cooperative actuators are configured to translate the velocity signal components into the haptic instructions that include one or more coordinated pulses by at least three of the actuators worn on the belt.

11. The remote guidance system of claim 1, wherein the movement signals include a stoppage signal to indicate a change from movement of one set of limbs or extremities to another set of limbs of extremities and the stoppage signal is to be translated into one or more coordinated pulses to all of the cooperative actuators worn on the belt.

12. The remote guidance system of claim 1, wherein the movement signals for the user's left hand is to be translated into one or more coordinated pulses to at least the left-front actuator on the belt.

13. The remote guidance system of claim 1, wherein the movement signals for the user's right hand is to be translated into one or more coordinated pulses to at least the right-front actuator on the belt.

14. A non-transitory computer-readable medium that stores one or more executable instructions that, when executed, cause one or more processors to:
receive, via a visual sensor, visual data regarding physical surroundings of a user,
measure, via weight/motion sensors configured to be attached to limbs and extremities of the user, current weight disposition and movements of the user,
produce signals in real-time to guide movements of the user's limbs or extremities,
wherein the signals include velocity signal components to indicate a change in velocity for the user's next physical movement, and
wherein the signals for the user's next physical movement are produced based at least in part on the visual data received via the visual sensor,
and the current weight disposition and movements of the user measured by the weight/motion sensors;
and transmit the signals to a receiver at which the signals are to be translated into coordinated prompts to guide the movements of the user's limbs or extremities,
wherein the signals are to be translated into coordinated prompts to guide the movements of the user's limbs or extremities in either of a vertical direction or a horizontal direction,
wherein the signals, after a first of the signals, are to be transmitted prior to completion of an immediately previous movement to guide the user's physical movement,
wherein the signals include horizontal and vertical directional signal components that indicate the horizontal and vertical direction for the user's next movement,
wherein further the coordinated prompts translated from the horizontal and vertical directional signal components differ in either duration or magnitude,
wherein the signals include horizontal directional signal components that indicate the horizontal direction for the user's next movement,
wherein further the coordinated prompts translated from the horizontal directional signal components differ in either duration or magnitude,
wherein the receiver is configured to be worn by the user on a belt and to include a processor and cooperative actuators to translate the signals into one or more coordinated pulses at various ones of the cooperative actuators, and the one or more coordinated pulses guide the user's next movements in an activity, and
wherein the one or more coordinated pulses are reconfigurable for respective limbs or extremities according to user preferences.

15. The non-transitory computer-readable medium of claim 14, wherein the computer-readable medium is configured in a remote control device, and wherein further the signals are prerecorded as part of a guidance application.

16. The non-transitory computer-readable medium of claim 14, wherein the user is an avatar.

17. The non-transitory computer-readable medium of claim 14, wherein the user's activity includes athletic activities.

18. The non-transitory computer-readable medium of claim 14, wherein the signals include angle signal components to indicate a change in angle magnitude for the user's next physical movement.

19. The non-transitory computer-readable medium of claim 14, wherein the cooperative actuators are configured on the belt to include a front-left actuator, a front-right actuator, a rear-left actuator, a rear-right actuator, a side-left actuator, and a side-right actuator.

20. The non-transitory computer-readable medium of claim 19, wherein the receiver is configured to translate the horizontal directional signal components into the coordinated pulses by the left-side actuator and the right-side actuator on the belt.

21. The non-transitory computer-readable medium of claim 19, wherein the cooperative actuators are configured to translate the velocity signal components into the coordinated pulses by at least three of the coordinated actuators.

22. The non-transitory computer-readable medium of claim 19, wherein the signals include angle signal components to indicate a change in angle magnitude for the user's next movement, and wherein further the receiver is configured to translate the velocity signal components into the coordinated pulses by at least three of the coordinated actuators.

23. The non-transitory computer-readable medium of claim 19, wherein the signals include a stoppage signal, to be translated by all of the cooperative actuators, to indicate a change from movement of one set of limbs or extremities to another set of limbs of extremities.

24. At least one non-transitory computer-readable medium that stores one or more executable instructions that, when executed, cause one or more processors to:
receive, via a visual sensor, visual data regarding physical surroundings of a user,
measure, via weight/motion sensors configured to be attached to limbs and extremities of the user, current weight disposition and movements of the user,
receive real-time signals to guide movements of the user's limbs or extremities, wherein the signals include velocity signal components to indicate a change in velocity for the user's next movement, and wherein the real-time signals for the user's next movement are determined based at least in part on the visual data received by the visual sensor and the current weight disposition and movements of the user measured by the weight/motion sensors; and translate the signals into coordinated prompts to guide the movements of the user's limbs or extremities, wherein the signals are to be translated into coordinated pulses to guide the movements of the user's limbs or extremities in either of a vertical direction or a horizontal direction, wherein the signals include horizontal and vertical directional signal components that indicate the horizontal and vertical direction for the user's next physical movement, wherein further the coordinated pulses translated from the horizontal and vertical directional signal components differ in either duration or magnitude, wherein the signals include horizontal directional signal components that indicate the horizontal direction for the user's next physical movement, wherein further the coordinated pulses translated from the horizontal directional signal components differ in either duration or magnitude, wherein the at least one computer-readable medium is configured in a processing receiver and in cooperative actuators, the processing receiver and the cooperative actuators are configured to be worn by the user on a belt, the cooperative actuators translate the signals into one or more coordinated pulses at various ones of the cooperative actuators, and the one or more coordinated pulses guide the user's next movements in an activity, and wherein the one or more coordinated pulses are reconfigurable for respective limbs or extremities according to user preferences.

25. The non-transitory computer-readable medium of claim 24, wherein the user's activity includes sporting activities.

26. The non-transitory computer-readable medium of claim 24, wherein the signals include angle signal components to indicate a change in angle magnitude for the user's next movement.

27. The non-transitory computer-readable medium of claim 24, wherein the coordinated actuators include a front-left actuator, a front-right actuator, a rear-left actuator, a rear-right actuator, a side-left actuator, and a side-right actuator.

28. The non-transitory computer-readable medium of claim 27, wherein the receiver is configured to translate the horizontal directional signal components into the coordinated pulses by the left-side actuator and the right-side actuator on the belt.

29. The non-transitory computer-readable medium of claim 27, wherein the receiver processor is configured to translate the velocity signal components into the coordinated pulses by at least three of the coordinated actuators.

30. The non-transitory computer-readable medium of claim 27, wherein the signals include angle signal components to indicate a change in angle magnitude for the user's next movement, and wherein further the receiver processor is configured to translate the velocity signal components into the coordinated pulses by at least three of the coordinated actuators.

31. The non-transitory computer-readable medium of claim 27, wherein the signals include a stoppage signal, to be actuated by all of the cooperative actuators, to indicate a change from movement of one set of limbs or extremities to another set of limbs of extremities.

* * * * *

UNITED STATES PATENT AND TRADEMARK OFFICE
CERTIFICATE OF CORRECTION

| | | |
|---|---|---|
| PATENT NO. | : 9,256,281 B2 | Page 1 of 1 |
| APPLICATION NO. | : 13/500657 | |
| DATED | : February 9, 2016 | |
| INVENTOR(S) | : Ur | |

It is certified that error appears in the above-identified patent and that said Letters Patent is hereby corrected as shown below:

In the Specification

In Column 1, Line 7, delete "§371" and insert -- § 371 --, therefor.

In Column 1, Line 10, delete "§371" and insert -- § 371 --, therefor.

In Column 1, Lines 26-32, delete "CROSS-REFERENCE TO RELATED APPLICATIONS
This Application is the National Stage filing under 35 U.S.C. §371 of PCT Application Ser. No. PCT/US11/51913 filed on Sep. 16, 2011. The disclosure of the PCT Application is hereby incorporated herein by reference in its entirety.".

In the Claims

In Column 20, Lines 20-22, in Claim 1, delete "activity        and to provide movement guidance in the form of a tactile stimulus," and insert -- activity and to provide movement guidance in the form of a tactile stimulus, --, therefor.

In Column 21, Lines 52-54, in Claim 14, delete "sensor,        and the current weight disposition and movements of the user measured by the weight/motion sensors;" and insert -- sensor, and the current weight disposition and movements of the user measured by the weight/motion sensors; --, therefor.

In Column 21, Line 54, in Claim 14, delete "by the" and insert -- via the --, therefor.

In Column 21, Lines 54-57, in Claim 14, delete "sensors;        and transmit the signals to a receiver at which the signals are to be translated into coordinated prompts to guide the movements of the user's limbs or extremities," and insert -- sensors; and transmit the signals to a receiver at which the signals are to be translated into coordinated prompts to guide the movements of the user's limbs or extremities, --, therefor.

Signed and Sealed this
Thirty-first Day of May, 2016

Michelle K. Lee
*Director of the United States Patent and Trademark Office*